(12) United States Patent
Inoue (10) Patent No.: US 7,566,163 B2
(45) Date of Patent: Jul. 28, 2009

(54) SCREW SET FOR EXTRUDER (75) Inventor: Kimio Inoue, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 796 days.

(21) Appl. No.: 09/767,885

(22) Filed: Jan. 24, 2001

(65) Prior Publication Data
US 2001/0019729 A1 Sep. 6, 2001

(30) Foreign Application Priority Data
Jan. 25, 2000 (JP) ............... 2000-017982

(51) Int. Cl.
B29B 7/48 (2006.01)

(52) U.S. Cl. .............. 366/81; 366/85; 366/88; 366/90; 425/204

(58) Field of Classification Search .......... 366/81, 366/82, 83–86, 88, 90, 89, 318, 319, 321–324; 425/204, 208, 209
See application file for complete search history.

(56) References Cited

U.S. PATENT DOCUMENTS

| | | | | |
|---|---|---|---|---|
| 2,351,493 A | * | 6/1944 | Curry | 425/188 |
| 3,137,035 A | * | 6/1964 | Hendry | 425/107 |
| 4,107,788 A | * | 8/1978 | Anders | |
| 4,824,256 A | | 4/1989 | Häring et al. | |
| 5,499,870 A | * | 3/1996 | Rockstedt | |
| 5,573,331 A | * | 11/1996 | Lin | 366/81 |
| 5,750,158 A | * | 5/1998 | Wissmann et al. | 425/144 |
| 5,947,593 A | * | 9/1999 | Inoue et al. | |
| 6,048,088 A | | 4/2000 | Häring et al. | |
| 6,106,142 A | * | 8/2000 | Rockstedt | |
| 6,170,975 B1 | * | 1/2001 | Andersen | |
| 6,179,459 B1 | * | 1/2001 | Kobayashi et al. | 366/77 |

(Continued)

FOREIGN PATENT DOCUMENTS

DE 3412258 A1 10/1985

(Continued)

OTHER PUBLICATIONS

U.S. Appl. No. 09/767,885, filed Jan. 24, 2001, pending.

(Continued)

Primary Examiner—David L Sorkin
(74) Attorney, Agent, or Firm—Oblon, Spivak, McClelland, Maier & Neustadt, P.C.

(57) ABSTRACT

A rotor segment is assembled in a screw set for use in a twin-screw extruder for mixing and dispersing a material to be kneaded into a kneaded product having a desired state of kneading. The rotor segment has a plurality of kneading blades that provide a plurality of tip clearances different from each other at least in the circumferential direction. The rotor segment also has the same sectional shape as a screw and a kneading disk, which are assembled in other screw segment and kneading disk segment of the screw set, except for crest portions of the kneading blades. A degradation in quality of a kneaded product attributable to residence of a target material of kneading for a long time can be satisfactorily prevented. A load partially imposed on the rotor segment can be reduced, thereby preventing a damage of the screw set in which the rotor segment is assembled.

4 Claims, 11 Drawing Sheets

U.S. PATENT DOCUMENTS 6,251,161 B1 6/2001 Tateishi et al.
6,254,665 B1 7/2001 Matsushita et al.
6,382,826 B1 * 5/2002 Della Rossa .............. 366/85

FOREIGN PATENT DOCUMENTS

DE   197 18 292 A1   11/1998
EP   0 850 738 A2   7/1998
JP   6-47734   2/1994

OTHER PUBLICATIONS

U.S. Appl. No. 10/032,555, filed Jan. 2, 2002, pending.
U.S. Appl. No. 10/123,253, filed Apr. 17, 2002, pending.
U.S. Appl. No. 10/293,337, filed Nov. 14, 2002, pending.
U.S. Appl. No. 10/303,763, filed Nov. 26, 2002, pending.
F. Hensen, et al., "Handbuch der Kunststoff-Extrusionstechnik", HANSER, 1989, cover page and pp. 332-333.

* cited by examiner

SCREW SET FOR EXTRUDER

BACKGROUND OF THE INVENTION

1. Field of the Invention

The present invention relates to a screw set for use in a twin-screw extruder for kneading materials to be kneaded, such as rubber and plastic.

2. Description of the Related Art

Generally, a twin-screw extruder is constructed by providing a pair of screw sets in a barrel having a chamber extending from one side to the other side, each of the screw sets being a combination of kneading segments, such as kneading rotors and kneading disks, and screw segments. A kneaded product is continuously produced by a series of operations of charging a material to be kneaded, such as rubber and plastic, into the barrel through an inlet at one side, kneading the charged material by the kneading segments while feeding the material toward the other side with the rotation of the screw sets, thereby forming a kneaded product in a desired state of kneading, and extruding the kneaded product to the outside from a tip end of the extruder (see FIGS. 1A and 1B for general construction).

The above-mentioned kneading rotors have tip clearances greater than those of the kneading disks, and therefore are advantageous in that a target material of kneading, which comprises a material to be kneaded and a kneaded material, can be kneaded at relatively low temperatures. However, since the greater tip clearances render the target material of kneading to adhere to an inner wall surface of the barrel, the kneading rotors have disadvantages that a trouble, such as a deterioration of the target material of kneading due to residence for a long time in the barrel or a damage of the screw set due to a load partially imposed on the kneading rotors, is more likely to occur.

Figure 11:
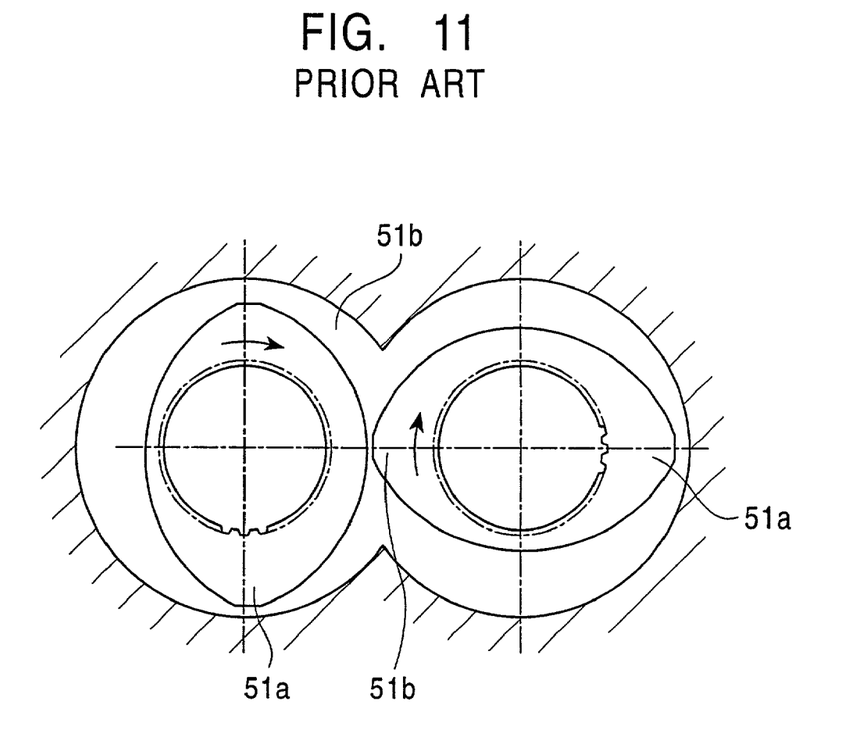
FIG. 11 is an explanatory view showing a state of conventional kneading rotors.

Recently, in view of the above-mentioned disadvantages, there has been proposed a twin-screw extruder comprising, as shown in FIG. 11, a pair of kneading rotors 51 and 51 each having kneading blades 51a and 51b that are formed to have contour shapes allowing the kneading rotors 51 and 51 to completely mesh with each other when a pair of left and right screw sets are arranged as shown, particular one 51 a of the kneading blades being formed to provide a smaller tip clearance (see Japanese Unexamined Patent Application Publication No. 10-264148). with this construction, the target material of kneading, which has adhered to the inner wall surface of the barrel, can be scrapped off by the kneading blade 51a having the smaller tip clearance, while ensuring advantages that one of the kneading rotors 51 and 51 meshing with each other functions to prevent the target material of kneading from adhering to the other, and the kneading blade 51b having a greater tip clearance serves to knead and disperse the target material of kneading into a satisfactory state, thereby preventing an excessive temperature rise.

In the conventional construction described above, however, since the kneading blades 51a and 51b are formed so as to allow the kneading rotors 51 and 51 to completely mesh with each other, the sectional shapes of the kneading rotors 51 and 51 are not in match with those of the kneading disks and screws. More specifically, in FIG. 11, the axis-to-axis distance between the left and right screw sets is constant, and the left and right kneading rotors 51 and 51 are completely meshed with each other. Looking at a certain section, therefore, when one kneading blade of the right kneading rotor, which has the greater tip clearance, is in a horizontal position, a relatively thin belly portion of the opposite left kneading rotor is positioned in an opposing relation. On the contrary, when the other kneading blade of the right kneading rotor, which has the smaller tip clearance, is in a horizontal position, a relatively thick belly portion of the opposite left kneading rotor is positioned in an opposing relation. in the arrangement that the left and right kneading rotors are completely meshed with each other and the kneading blades of each rotor are formed to provide different tip clearances, therefore, assuming the screw sets to be cut at a certain section, the sectional shapes of the left and right kneading rotors are asymmetrical and hence not the same on the left and right sides. Stated otherwise, looking at one screw set, the sectional shape of the kneading rotor is changed in the axial direction thereof.

Supposing now, as described above, that the sectional shapes of the left and right kneading rotors are changed in the axial direction thereof so as to allow both the kneading rotors to completely mesh with each other, i.e., that the left and right kneading rotors are formed to have the sectional shapes asymmetrical on the left and right sides, if two adjacent segments in the axial direction of one screw set have different sectional shapes from each other, two adjacent segments in the axial direction of the other screw set, which are respectively in mesh with the former two adjacent segments, also have different sectional shapes from each other. This means that, among four segments of the left and right screw sets, pairs of which are opposed in the transverse direction and adjacent to each other in the axial direction, each pair of segments in an obliquely opposing relation are not properly meshed with each other. In other words, the segments of both the screw sets, which are in an obliquely opposing relation and should not be meshed with each other in a proper setup condition, are positioned side by side in the transverse direction at connecting portions between the axially adjacent segments of the screw sets upon a slight shift in the axial direction, and then interfere with each other at the connecting portions because of the left and right kneading rotors having different sectional shapes. Thus, if two adjacent segments of each screw set in the axial direction have sectional shapes different at a connecting portion between the segments, the left and right rotors interfere with each other at the connecting portions upon a slight shift (relative movement) of the left and right rotors in the axial direction thereof Therefore, the related art requires a spacer to be inserted in the connecting portion between every two axially adjacent segments of each screw set. The spacer has a thickness enough to absorb such a slight rotor shift in the axial direction, and also has a sectional shape selected such that the spacers arranged in an opposing relation are prevented from interfering with each other due to their sectional shapes.

In the case of inserting such spacers, the spacers produce gaps between the segments and hence give rise to a problem that, since the target material of kneading tend to reside in the gaps for a long time and deteriorate, a degradation in quality of the kneaded product caused by the deterioration of the target material of kneading cannot be sufficiently prevented.

Furthermore, when the tip clearance of the rotor segment is changed at short intervals in the axial direction for reducing a load partially imposed on the rotor segment, a rotor segment having a small axial length must be prepared. This leads to another problem that the cost of manufacturing the rotor segment is increased and the assembly operation takes larger amounts of labor and time.

SUMMARY OF THE INVENTION

Accordingly, it is an object of the present invention to provide a screw set which can sufficiently prevent a degradation in quality of a kneaded product attributable to residence of a target material of kneading for a long time, can easily change a tip clearance of a rotor segment in the axial direction, and can reduce a load partially imposed on the rotor segment, thereby preventing a damage of the rotor segment.

According to the present invention, in a screw set for a twin-screw extruder for mixing and dispersing a material to be kneaded into a kneaded product having a desired state of kneading, the screw set comprises a rotor segment comprising at least one kneading rotor, the kneading rotor having a plurality of kneading blades, which provide a plurality of tip clearances different from each other at least in the circumferential direction, and having the same sectional shape in the axial direction except for crest portions of the kneading blades; and a screw segment comprising at least one screw, a portion of the screw segment except for crest portions of screw blades thereof having the same sectional shape as a portion of the rotor segment except for the crest portions of the kneading blades.

The screw set for the twin-screw extruder according to the present invention may further comprise a kneading disk segment comprising at least one kneading disk, a portion of the kneading disk segment except for crest portions of disk blades thereof having the same sectional shape as the portion of the rotor segment except for the crest portions of the kneading blades.

Further, in screw set for the twin-screw extruder according to the present invention, all of segment members may have the same sectional shape as the portion of the rotor segment except for the crest portions of the kneading blades.

In the present invention, for necessary one of segments constituting one screw set, one entire segment has the same sectional shape in the axial direction. In addition, different segments also have the same sectional shape. This sectional shape is selected such that left and right screw sets can be meshed with each other sufficiently even though not completely. Further, a distance (tip clearance) between a blade tip and a barrel inner surface and a twist angle of the blade with respect to the axial direction are set depending on the function of each segment. Thus, in the present invention, the crest portion of the blade is changed depending on the function of each segment, whereas it is essential that the segments have the same sectional shape except for portions necessary for adjusting the distance between the blade tip and the barrel inner surface. In the case of a two-blade rotor, for example, crest portions of blades are positioned apart from each other by a central angle of 180°. Also, so long as the same sectional shape is maintained among the segments, the twist angle of the blade with respect to the axial direction may be different from one segment to another segment.

Usually, in the rotor segment, the distance between the blade tip and the barrel inner surface is increased so that the material under kneading easily passes through the tip clearance, and the twist angle of the blade with respect to the axial direction is reduced so that the material under kneading is easily subjected to a shearing force. In the screw segment, the distance between the blade tip and the barrel inner surface is reduced to enhance an ability of feeding the material under kneading while scraping off it, and the twist angle of the blade with respect to the axial direction is increased to enhance an ability of feeding the material under kneading axially.

With the above-described construction of the present invention, the segment members including the kneading rotor, which are assembled into the screw set, have the same sectional shape except for the crest portions of the kneading blades. Therefore, even when the screw set is arranged in pair on the left and right sides and the kneading rotor is directly connected to another segment member and brought into a sufficiently meshed state, the left and right screw sets will not interfere with each other at any connecting portions of the segment members. As a result, no gaps are produced between the kneading rotor and the another segment member unlike the care of inserting a spacer therebetween. It is hence possible to satisfactorily prevent a degradation in quality, such as property change and burning of the kneaded product, attributable to a phenomenon that the target material of kneading enters those gaps and resides there for a long time.

In the screw set for the twin-screw extruder according to the present invention, the kneading rotor may provide a plurality of tip clearances different from each other in the axial direction of the rotor segment.

With the construction described above, since a plurality of tip clearances are provided in the axial direction of the rotor segment, it is possible to reduce a load partially imposed on the rotor segment, and to further promote dispersion and mixing of the target material of kneading. Also, since the rotor segment has the same sectional shape except for the crest portions of the blades, the tip clearances can be freely changed within one rotor segment in the axial direction, and a load partially imposed on the rotor segment can be more easily reduced.

In the screw set for the twin-screw extruder according to the present invention, the rotor segment may comprise at least one of three types including a first type in which the kneading blades are twisted clockwise with respect to the axial direction, a second type in which the kneading blades are extended parallel to the axial direction, and a third type in which the kneading blades are twisted counterclockwise with respect to the axial direction. As an alternative, the rotor segment may comprise at least two or all of the three types.

With the construction described above, since a flow condition of the material under kneading is changed depending on the twisting direction of the kneading rotors, a filling state of the material under kneading in the rotor segment can be set to any desired degree by forming the rotor segment in a proper combination of three types of kneading rotors having different twisting directions. As a result, the rotor segment can be formed so as to have the mixing and dispersing abilities optimum for properties of the material to be kneaded, or the feeding ability optimum for the material to be kneaded.

In the screw set for the twin-screw extruder according to the present invention, the number of the kneading blades may be two.

With the construction described above, a sectional area of a flow path for the material under kneading is increased, and therefore the production capacity can be enhanced. Also, since the kneading rotor can be combined with the kneading disk and the screw which is a two-thread screw in the basic form, the screw set can be easily obtained in various configurations.

In the screw set for the twin-screw extruder according to the present invention, the number of the kneading blades may be three.

With the construction described above, a load partially imposed on the rotor segment can be distributed in three direction and hence reduced. Further, since the amount of the material under kneading which passes through tip clearances is increased, a higher dispersing ability can be achieved.

BRIEF DESCRIPTION OF THE DRAWINGS

FIG. 1 is an explanatory view schematically showing a construction of a twin-screw extruder, in which
FIG. 1A is a front view and
FIG. 1B is a sectional view taken along line 1B-1B;

FIG. 3 is a perspective view of a kneading rotor, in which

FIG. 4 is an explanatory view showing states of the kneading rotors and a target material of kneading in the chamber, in which

DESCRIPTION OF THE PREFERRED EMBODIMENTS

A preferred embodiment of the present invention will be described below with reference to FIGS. 1 to 10.

Figures 1, 1A:
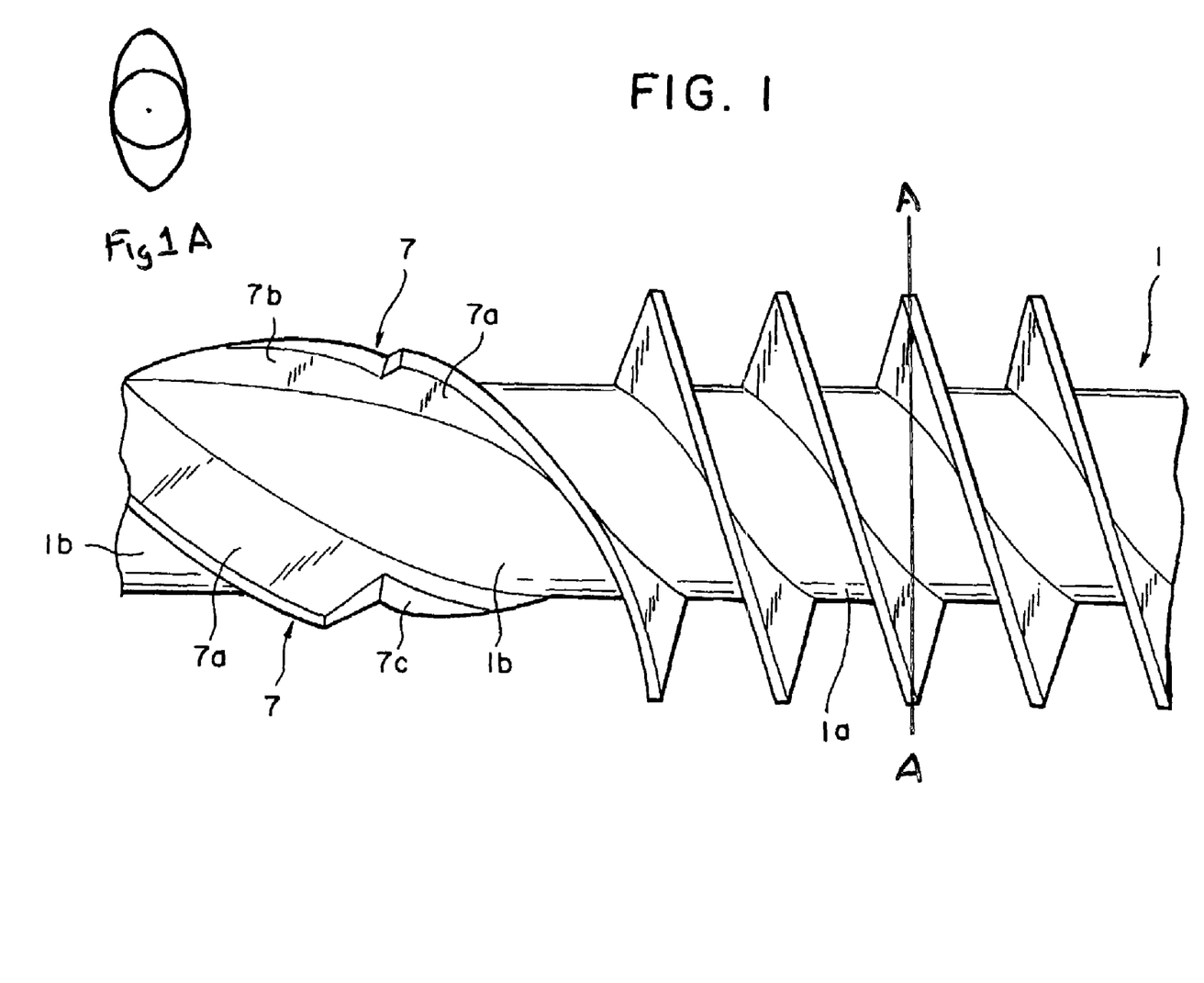

As shown in FIGS. 1A and 1B, a twin-screw excluder of this embodiment comprises a pair of screw sets 1 and 1, and a barrel 3 supporting the screw sets 1 and 1 in a rotatable manner. Cooling pipes (not shown) are joined to an outer wall surface of the barrel 3 so that a kneaded product is cooled through the barrel 3. Inside the barrel 3, a chamber 4 is formed to extend from one side (left side in the drawing) to the other side (right side in the drawing). At the one side of the barrel 3, an inlet 3a is formed in communication with the chamber 4 for supplying a material to be kneaded, such as rubber and plastic, into the chamber 4.

Figure 2:
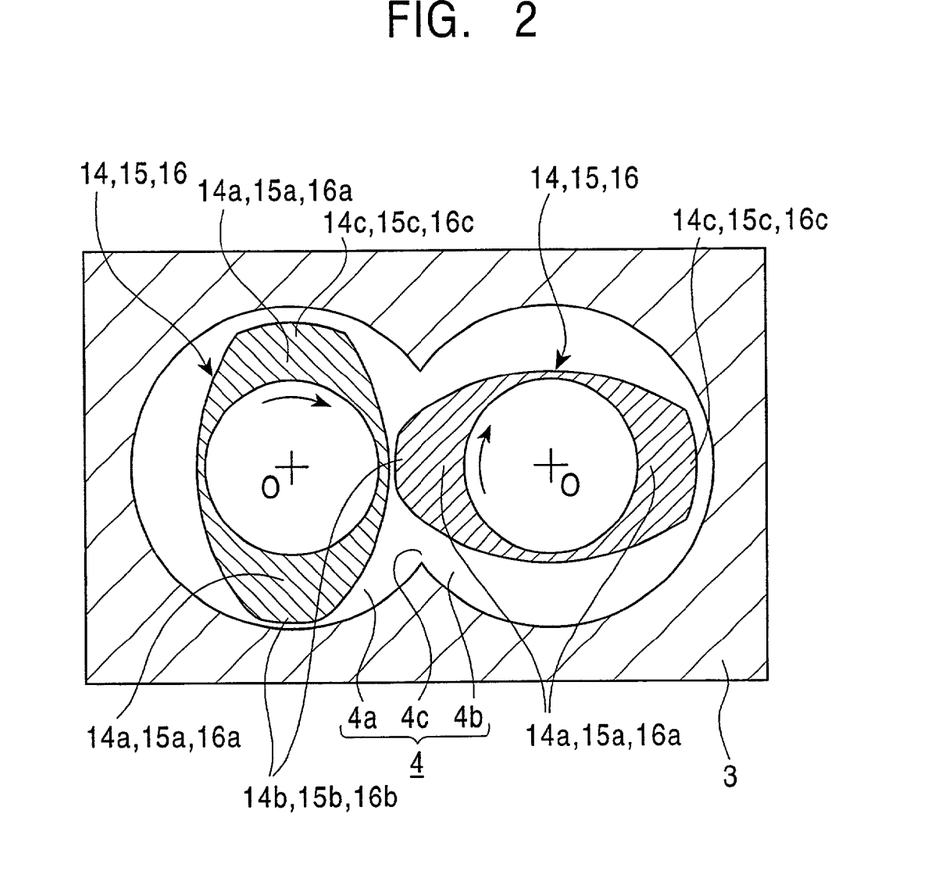
FIG. 2 is an explanatory view showing a state of kneading rotors in a chamber.

As shown in FIG. 2, the chamber 4 is formed to have a cocoon-shaped vertical section, and comprises one pair of first kneading chamber 4a and second kneading chamber 4b, and a communicating portion 4c for communicating these first and second kneading chambers 4a, 4b with each other. The screw sets 1 and 1 penetrate through the first and second kneading chambers 4a, 4b, respectively, as shown in FIGS. 1A and 1B.

The screw sets 1 and 1 are arranged with their axes extending parallel to each other, and are coupled to a driving mechanism outside of the barrel (not shown) for rotation in the same direction. The centers 0 (axes) about which both the screw sets 1 and 1 are rotated by the driving mechanism coincide with the centers of the chambers in the barrel 3. Note that, as shown in FIG. 2, the chamber centers exist in the first and second kneading chambers 4a, 4b of the chamber 4 and means central points positioned at equi-distances from inner wall surfaces of the kneading chambers 4a, 4b each having an arc-shaped section.

Further, as shown in FIG. 1A, each of the screw sets 1 and 1 comprises two-blade type screw segments 11 for pushing the material under kneading out to the opposite side, two-blade type rotor segments 12 for mixing and dispersing the material under kneading, and two-blade type kneading disk segments 13 for primarily mixing the material under kneading. The screw segments 11 are arranged in upstream, middle and downstream positions along the screw set 1. Between the upstream and middle screw segments 11, a first-stage rotor segment 12 is arranged and the kneading segments 13 and 13 are arranged on both sides of the firststage rotor segment 12. Also, between the middle and downstream screw segments 11, a second-stage rotor segment 12 is arranged, and a screw 11a and the kneading disk segment 13 are arranged in this order downstream of the second-stage rotor segment 12.

The screw segment 11 comprises a plurality of screws 11a. Each screw 11a has such a sectional shape that blades are arranged in a 180°-apposing relation about the center 0 of rotation thereof. The blades are formed so as to have outer wall surfaces spirally twisted in the axial direction. The screws 11a are interconnected such that their blades are aligned with each other, thereby constituting the screw segment 11 for feeding out the kneaded product through grooves between the blades.

The kneading disk segment 13 comprises a plurality of kneading disks 13a in the form of flat plates. Each kneading disk 13a has the same sectional shape as that of the screw 11a; that is, blades are arranged in a 180°-opposing relation about the center 0 of rotation thereof. Further, the kneading disks 13a are interconnected such that the blades of the adjacent kneading disks 13a and 13a are positioned 60° out of phase from each other, thereby constituting the kneading disk segment 13 for kneading the material to be kneaded through tip clearances between the blade crests and the inner wall surface of the chamber 4.

The rotor segment 12 is constructed as a combination of forward and backward type kneading rotors 14, 16. The rotor segment 12 may further comprise a neutral type kneading rotor 15 shown in FIG. 3B. As shown in FIG. 2, the kneading rotors 14-16 have pairs of kneading blades 14a- 16a, each pair being arranged in a 180°-opposing relation about the center 0 of rotation thereof. Except for crest portions, the kneading blades 14a-16a have the same sectional shapes as those of the screw 11a and the kneading disk 13a.

Figure 3A:
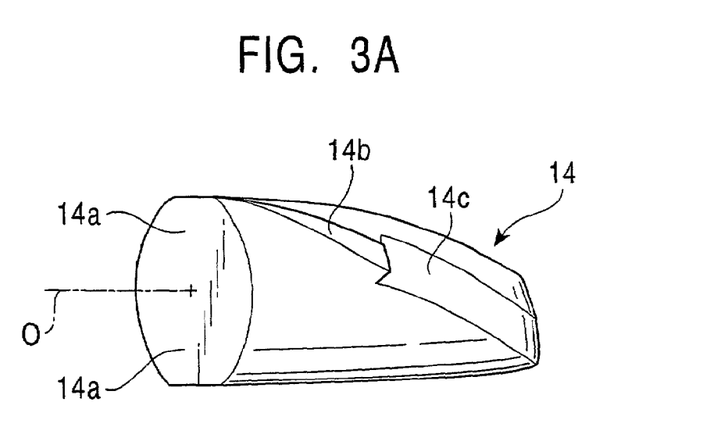
FIG. 3A shows a forward type kneading rotor.
Figure 3B:
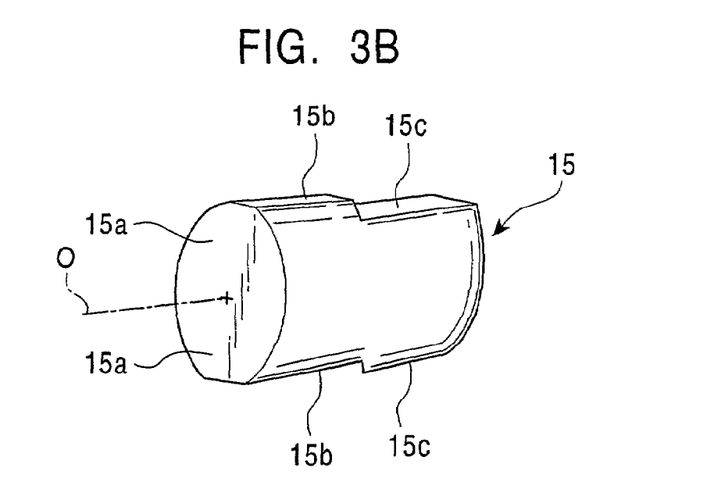
FIG. 3B shows a neutral type kneading rotor.
Figure 3C:
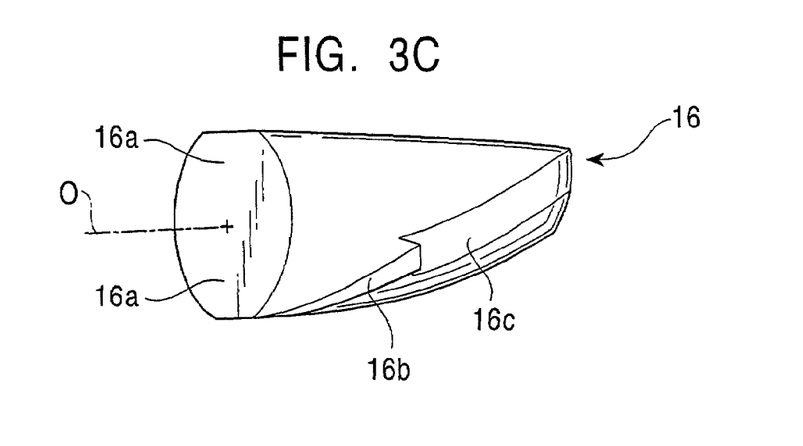
FIG. 3C shows a backward type kneading rotor.

As shown in FIG. 3A, the kneading blades 14a of the forward type kneading rotor 14 are spirally twisted clockwise with respect to the axial direction so that the kneaded product is advanced in the direction of flow of the material under kneading. Thus, the forward type kneading rotor 14 functions to advance the kneaded product for increasing a production capacity. Also, as shown in FIG. 3B, the kneading blades 15a of the neutral type kneading rotor 15 are formed parallel to the axial direction so that neither forward nor backward movement of the kneaded product is accelerated. Thus, the neutral type kneading rotor 15 functions to increase the degrees of both filling and kneading of the kneaded product, which are achieved by the rotor segment 12. Further, as shown in FIG. 3C, the kneading blades 16a of the backward type kneading rotor 16 are spirally twisted counterclockwise with respect to the axial direction so that the kneaded product is moved back against the direction of flow of the material under kneading. Thus, the backward type kneading rotor 16 functions to increase the degrees of both filling and kneading of the kneaded product, which are achieved by the rotor segment 12.

In addition, the kneading blades 14a-16a of the kneading rotors 14-16 have crest portions axially divided into taller tip portions 14b-16b and lower tip portions 14c-16c. Each pair of the taller tip portions 14b-16b and the lower tip portions 14c-16c are arranged in a 180°-opposing relation about the center (axis) 0 of rotation thereof so that both the tip portions 14b-16b and 14c-16c are present throughout in the circumferential direction of the kneading rotors 14-16.

As seen from FIG. 2, the taller tip portions 14b-16b are formed such that, when the kneading rotors 14-16 are fitted in the barrel 3, each taller tip portions provides a small tip clearance between itself and the inner wall surface of the chamber 4. With this arrangement, the taller tip portions 14b-16b each function, when the kneading rotors 14-16 are rotated, not only to allow part of the material under kneading to pass through the small tip clearance while imparting a large shearing force to the part of the material, but also to scrape off a surface layer of the material under kneading which has adhered to the inner wall surface of the chamber 4, thereby improving the cooling efficiency. Further, the taller tip portions 14b-16b each function to improve both the kneading efficiency and the dispersing efficiency by axially moving most of the material under kneading, which is positioned on the forward side, to accelerate flow of the material under kneading in the axial direction and to accelerate flow of the material under kneading between the first and second kneading chambers 4a, 4b. The tip clearance of each of the taller tip portions 14b-16b can be set equal to or greater than that of the kneading disk or screw segment.

On the other hand, the lower tip portions 14c-16c are each formed so as to provide a greater tip clearance between itself and the inner wall surface of the chamber 4 than that provided by the taller tip portions 14b-16b. With this arrangement, the lower tip portions 14c-16c each function, when the kneading rotors 14-16 are rotated, not only to impart a small shearing force to the material under kneading in the tip clearance for increasing the amount the material under kneading which passes through the tip clearance, thereby accelerating flow of the material under kneading in each of the first and second kneading chambers 4a, 4b, but also to prevent a great shearing force from being locally imparted to the material under kneading, thereby suppressing an excessive temperature rise of the material under kneading.

In general, the kneading rotors 14-16 are preferably set depending on application cases as follows. In the case of obtaining a kneaded product by kneading and dispersing such substances as low-viscosity materials, fine fillers and pigments, the kneading rotors 14-16 are set such that the kneading blades 14a-16a provide relatively small tip clearances as a whole. In the case of obtaining a kneaded product by kneading and dispersing high-viscosity materials, the kneading rotors 14-16 are set such that the kneading blades 14a-16a provide relatively great tip clearances as a whole.

The preparation and operation of the twin-screw extruder having the above-described construction will be described below.

First, the kneading rotors 14-16 having the same two-blade sectional shapes as those of the screw 11a and the kneading disk 12a are fabricated. By cutting crest portions of the kneading blades 14a-16a horizontally or into convexly curved shapes, the taller tip portions 14b-16b and the lower tip portions 14c-16c are formed.

Then, the rotor segment 12 is fabricated by combining the different types of kneading rotors 14-16, shown in FIGS. 3A to 3C, in the proper combination. Thereafter, the screw set 1 is assembled by connecting the rotor segments 12, the screw segments 11, and the kneading disk segments 13 in the proper order, as shown in FIG. 1A. Two screw sets 1 and 1 thus assembled are fitted in the barrel 3 and brought into a sufficiently meshed state. At this time, since the segments 11-13 are formed into the same sectional shape except for the crest portions of the rotor segments 12, the two screw sets will not interfere with each other at any connecting portions of the segments 11-13 even when all of the segments 11-13 are directly interconnected with-out using any spacers.

Incidentally, in the three types of kneading rotors shown in FIGS. 3A to 3C, twist angles of the blades with respect to the axial direction are different from each other, but the same sectional shape is maintained through all the types except for the blade crest portions.

Subsequently, a material to be kneaded, such as rubber, plastic and fillers, is continuously supplied to the chamber 4 through the inlet 3a while the screw sets 1 and 1 are rotated in the same direction. Just before or after the start of supply of the material, a coolant such as cooling water is introduced to flow through the cooling pipes, which are joined to the outer wall surface of the barrel 3, so that the material under kneading in the chamber 4 is cooled through the barrel 3. Depending on the makeup or kinds of materials to be kneaded, e.g., for a material with fillers, the material under kneading may be heated by introducing a heat medium, such as hot water or vapor, to flow through the cooling pipes, or electrically heating the barrel.

The material to be kneaded, which has been charged into the chamber 4, advances toward the downstream kneading disk 13 with the rotation of the screw segment 11. After being kneaded by the kneading disk 13, the kneaded material reaches the first-stage rotor segment 12 where, as shown in FIG. 2, the material starts to be kneaded by the kneading blades 14a, 16a of the kneading rotors 14, 16 in the first-stage rotor segment 12.

That kneading process will be described in more detail with reference to FIGS. 4A to 4C. Since the taller tip portion 14b, 16b of each type of kneading rotor 14, 16 provides a smaller tip clearance, the amount of a target material of kneading, comprising a material to be kneaded and a kneaded material, which passes through the smaller tip clearance is also small. Therefore, the target material of kneading located forward of the taller tip portion 14b, 16b in the rotating direction is mostly caused to flow axially and moved to the lower tip portion 14c, 16c adjacent to the taller tip portion 14b, 16b in the axial direction, whereas part of the target material of kneading passes through the smaller tip clearance. Such part of the target material of kneading is dispersed because it is subjected to a great shearing force while passing through the smaller tip clearance. At the same time as the part of the target material of kneading is dispersed, the temperature of the target material of kneading is abruptly increased due to the great shearing force imparted to it. However, since most of the target material of kneading is caused to flow axially, a temperature rise of the target material of kneading is suppressed as a whole. As a result, even when the target material of kneading has a relatively low allowable temperature, the dispersion of the material under the great shearing force can be continued without troubles.

Further, since the taller tip portion 14b, 16b is moved to pass positions close to the inner wall surface of the chamber 4, it can scrape off a surface layer of the target material of kneading, which has adhered to the inner wall surface of the chamber 4. It is therefore possible to prevent a deterioration of the material quality caused by adhesion of the target material of kneading to the inner wall surface of the chamber 4, to prevent the screw from wobbling due to a load partially imposed on the rotor segment 12, and to improving the efficiency of cooling the target material of kneading by the coolant flowing through the cooling pipes, thereby more surely suppressing a temperature rise of the target material of kneading. Further, when the taller tip portion 14b, 16b moves through the communicating portion 4c, it pushes out the target material of kneading from one of the first and second kneading chambers 4a, 4b to the other by a great pressing force. Accordingly, flow of the target material of kneading between the first and second kneading chambers 4a, 4b can also be accelerated.

On the other hand, since the lower tip portion 14c, 16c provides a greater tip clearance, the amount of the target material of kneading which passes through the greater tip clearance is also large. Therefore, the target material of kneading located forward of the lower tip portion 14c, 16c in the rotating direction is mostly moved to the taller tip portion 14b, 16b adjacent to the lower tip portion 14c, 16c in the circumferential direction after having passed through the greater tip clearance, whereas part of the target material of kneading is caused to flow axially. Also, since a pressing force acting to push out the target material of kneading is small, flow of the target material of kneading from one of the first and second kneading chambers 4a, 4b to the other is suppressed when the target material of kneading is moved through the communicating portion 4c. Accordingly, the lower tip portion 14c, 16c can accelerate flow of the target material of kneading in each of the first and second kneading chambers 4a, 4b. Also, in this flow of the target material of kneading, the greater tip clearance serves to reduce a shearing force imparted to the target material of kneading, whereby an excessive temperature rise of the target material of kneading can be suppressed.

Figure 4A:
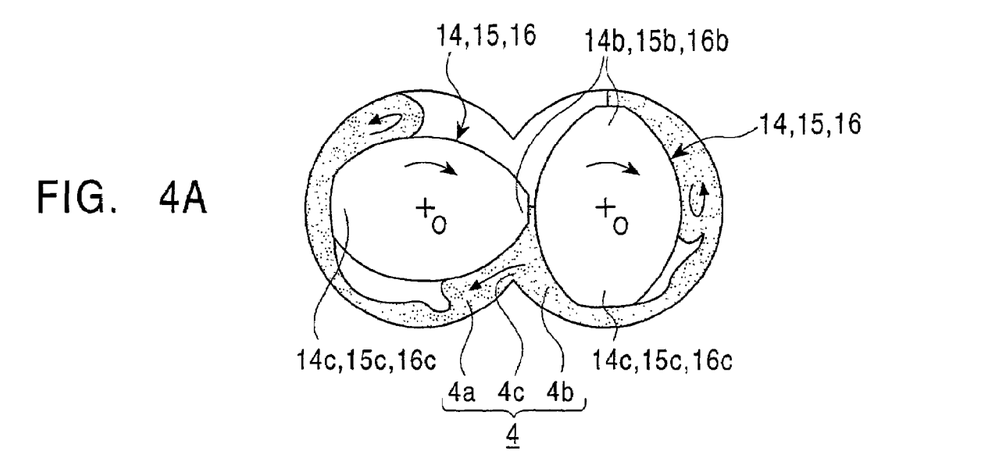
FIG. 4A shows the relationship between a taller tip portion of one kneading rotor and an inner wall surface of the chamber.
Figure 4B:
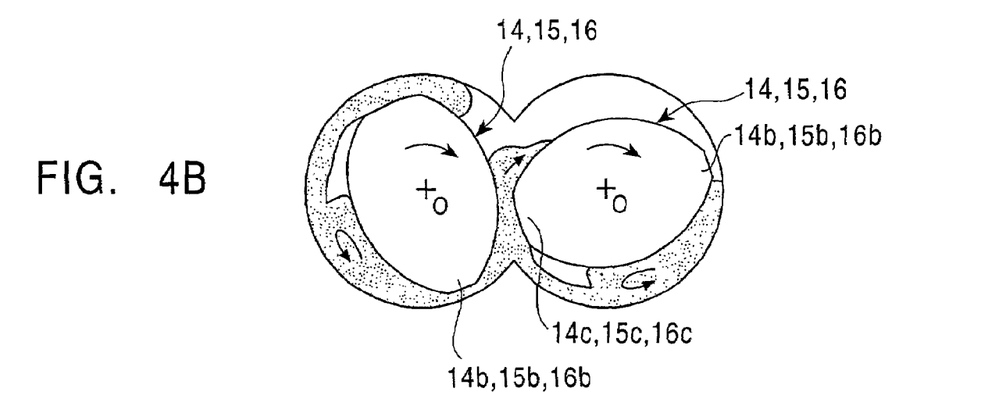
FIG. 4B shows the relationship between a lower tip portion of one kneading rotor and a wall surface of the other kneading rotor.
Figure 4C:
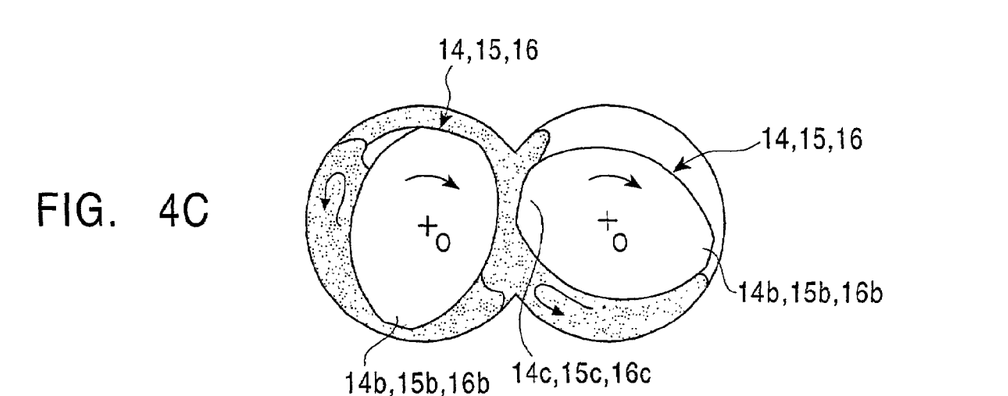
FIG. 4C shows a state where the lower tip portion of one kneading rotor moves away from the other kneading rotor.

When the lower tip portion 14c, 16c of one of the kneading rotors 14 and 16 passes near the surface of the other kneading rotor as shown in FIG. 4B, there is produced a gap between them greater than produced when the higher tip portion 14b, 16b of one of the kneading rotors 14 and 16 passes near the surface of the other kneading rotor as shown in FIG. 4A. The meshed state of the kneading rotors 14, 16 is therefore slightly loosened. In such a gap, however, since the surfaces of the kneading rotors 14 and 16 are moved in opposite directions and act to flip out the target material of kneading from the gap, the amount of the target material of kneading which passes through the gap is reduced. As a result, adhesion of the target material of kneading to the rotor surfaces defining the gap therebetween is so low that the target material of kneading adhering to the rotor surfaces can be surely scraped off even when the meshed state of the kneading rotors 14, 16 is slightly loosened. It is thus possible to prevent a deterioration of the target material of kneading caused by a residence for a long time, and to improve the degree of mixing when part of the target material of kneading passes through the gap between the rotors.

Further, as seen from FIG. 1A, the forward type kneading rotor 14 functions to advance the target material of kneading in the flowing direction on the entrance side of the first-stage rotor segment 12, whereas the backward type kneading rotor 16 functions to move back the target material of kneading against the flowing direction on the exit side. With this arrangement the rotor segment 12 causes the target material of kneading to have a predetermined state of filling and feeds out, to a subsequent stage, the target material of kneading as a kneaded product in a predetermined state of mixing and dispersion. Then, since the subsequent kneading disk segment 13 is directly connected to the rotor segment 12 without a spacer, all of the kneaded product flowing out of the rotor segment 12 is introduced to the kneading disk segment 13 where the kneaded product is further dispersed into a sufficient level. Thereafter, the kneaded product is sent out to the middle screw segment 11. Subsequently, the middle screw segment 11 causes the kneaded product to flow into the second-stage rotor segment 12. After being further dispersed in the second-stage rotor segment 12 with similar operations as described above, the kneaded product is discharged to the outside through the downstream screw segment 11.

An experiment was conducted to examine a state of a kneaded product actually obtained by using the screw set 1 provided with the kneading rotors 14-16 of this embodiment.

Figure 5:
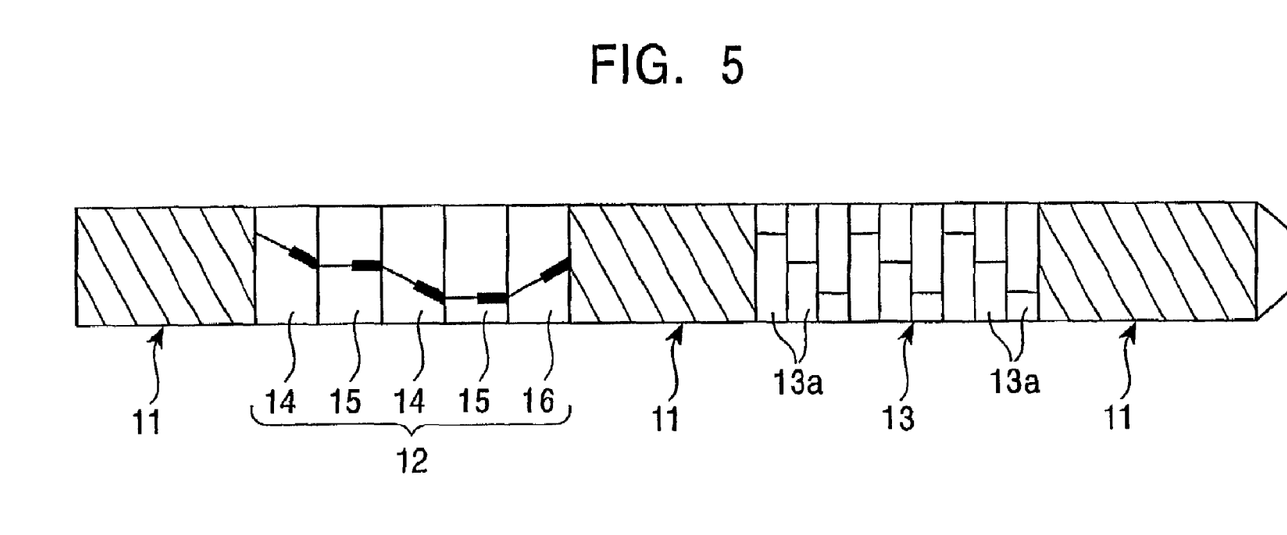
FIG. 5 is an explanatory view showing a combined state of respective segments of a screw set.

The different types of kneading rotors 14-16, shown in FIGS. 3A to 3C, were prepared in which the diameter was set to 58 mm, the lower tip clearance provided by each of the taller tip portions 14b-16b was set to 0.5 mm, and the greater tip clearance provided by each of the lower tip portions 14c-16c was set to 3 mm. The kneading blades 14a-16a of the kneading rotors 14-16 were set such that the forward type has a twist angle of 300 with respect to the axial direction, the neutral type has a twist angle of 0° with respect to the axial direction and the backward type has a twist angle of 30° with respect to the axial direction. Then, the rotor segment 12 having a segment length of 50 mm was fabricated by arranging the three types of kneading rotors 14-16 in the order of the forward type, the neutral type, the forward type, the neutral type, and the backward type in the flowing direction, as shown in FIG. 5.

Thereafter, the kneading disk segment 13 having the same length (50 mm) as the rotor segment 12 was fabricated, and the screw set 1 was completed by interconnecting the segments 11-13 in the proper combination. A pair of screw sets 1 were set in an extruder, and an operating condition of the extruder was examined by kneading an ABS frame-resistant compound while rotating each screw set 1 at a predetermined rotational speed.

As a result, it was confirmed that, when an ABS frame-resistant compound was kneaded while rotating each screw set 1 at a rotational speed of 520 (rpm), the throughput per hour was 700 kg/h and the compound could be produced in a lower temperature range (not higher than 230° C.) below the quality assurance temperature (240° C.) at which a thermal deterioration of the compound occurred. Further, since the finally kneaded product had no color change, it was indirectly confirmed that long-time residence of the ABS frame-resistant compound caused by adhesion of the compound to the inner wall surface of the chamber 4 did not occur.

For comparison with the above examined result of this embodiment, another experiment was also conducted to examine a state of a kneaded product obtained by kneading the ABS frame-resistant compound with a screw set wherein the rotor segment 12 of the screw set 1 was replaced by a kneading disk segment in the conventional configuration which had the same length as the rotor segment 12 and comprised the forward type, the neutral type and the backward type. In this comparative case, when trying to produce a kneaded product in a temperature range below the quality assurance temperature (240° C.), it was required to rotate each screw set at a rotational speed not higher than 400 (min$^{-1}$). it was hence confirmed that the throughput per hour was reduced to 400 kg/h.

In other words, by employing the rotor segment according to the present invention, the production capacity is increased in comparison with the kneading disk segment in the conventional configuration, because the temperature of the kneaded product can be kept not higher than a certain value even at a higher rotational speed of the screw set.

As described above, the kneading rotors 14-16 in this embodiment are assembled, as shown in FIG. 1A, into the rotor segment 12 of the screw set 1 in the twin-screw extruder for mixing and dispersing the target material of kneading so that a kneaded product can be obtained in a desired state of kneading. Also, the kneading rotors 14-16 each have two (i.e., a plurality of) kneading blades 14a-16a that provide a plurality of tip clearances different from each other at least in the circumferential direction. Further, the kneading rotors 14-16 are formed so as to have the same sectional shape as other segment members (the screw 11*a* and the kneading disk 13*a*), which are assembled as other segments (the screw segment 11 and the kneading disk segment 13) of the screw set 1, except for the crest portions thereof.

While the embodiment has been described in connection with the case where the other segment members are the screw 11*a* and the kneading disk 13*a*, the present invention is not limited to the illustrated embodiment. For example, the other segment member may be any one of the screw 11*a* and the kneading disk 13*a*, or may be any other member than the screw 11*a* and the kneading disk 13*a*.

Also, while the embodiment has been described in connection with the case where the number of the kneading blades 14*a*-16*a* are two for each rotor as shown in FIG. 2, the number of the kneading blades 14*a*-16*a* may be three or more for each rotor. When the number of the kneading blades 14*a*-16*a* is two for each rotor, the following advantages are obtained. A sectional area of a flow path defined in the chamber 4 for the target material of kneading is increased, and therefore the production capacity can be enhanced. Since the kneading rotors can be combined with the kneading disk 13*a* and the screw 11*a* which is a two-thread screw in the basic form, the screw set 1 can be easily obtained in various configurations.

On the other hand, when the number of the kneading blades 14*a*-16*a* is three or more for each rotor, the sectional area of the flow path is reduced, but a load partially imposed on the rotor segment 12 is distributed in three direction and hence reduced. Further, since the amount of the target material of kneading which passes through tip clearances is increased, a higher dispersing ability can be achieved. in addition, since tip clearances in the axial direction and the circumferential direction can be optionally selected from among large, medium and small values, it is possible to very finely set the dispersing and mixing abilities of the rotor segment 12.

With the construction described above, the segment members and the kneading rotors 14-16, which are assembled into the screw set 1, have the same sectional shape except for the crest portions of the kneading blades 14*a*-16*a*. Therefore, even when the screw set 1 is arranged in pair on the left and right sides and the kneading rotors 14-16 are directly connected to the segment members and brought into a sufficiently meshed state, the left and right screw sets will not interfere with each other at any connecting portions of the segment members. Consequently, no gaps are produced between the kneading rotors 14-16 and the segment members unlike the case of inserting spacers therebetween. It is hence possible to satisfactorily prevent a degradation in quality, such as property change and burning of the kneaded product, attributable to a phenomenon that the target material of kneading enters those gaps and resides there for a long time.

Figure 6:
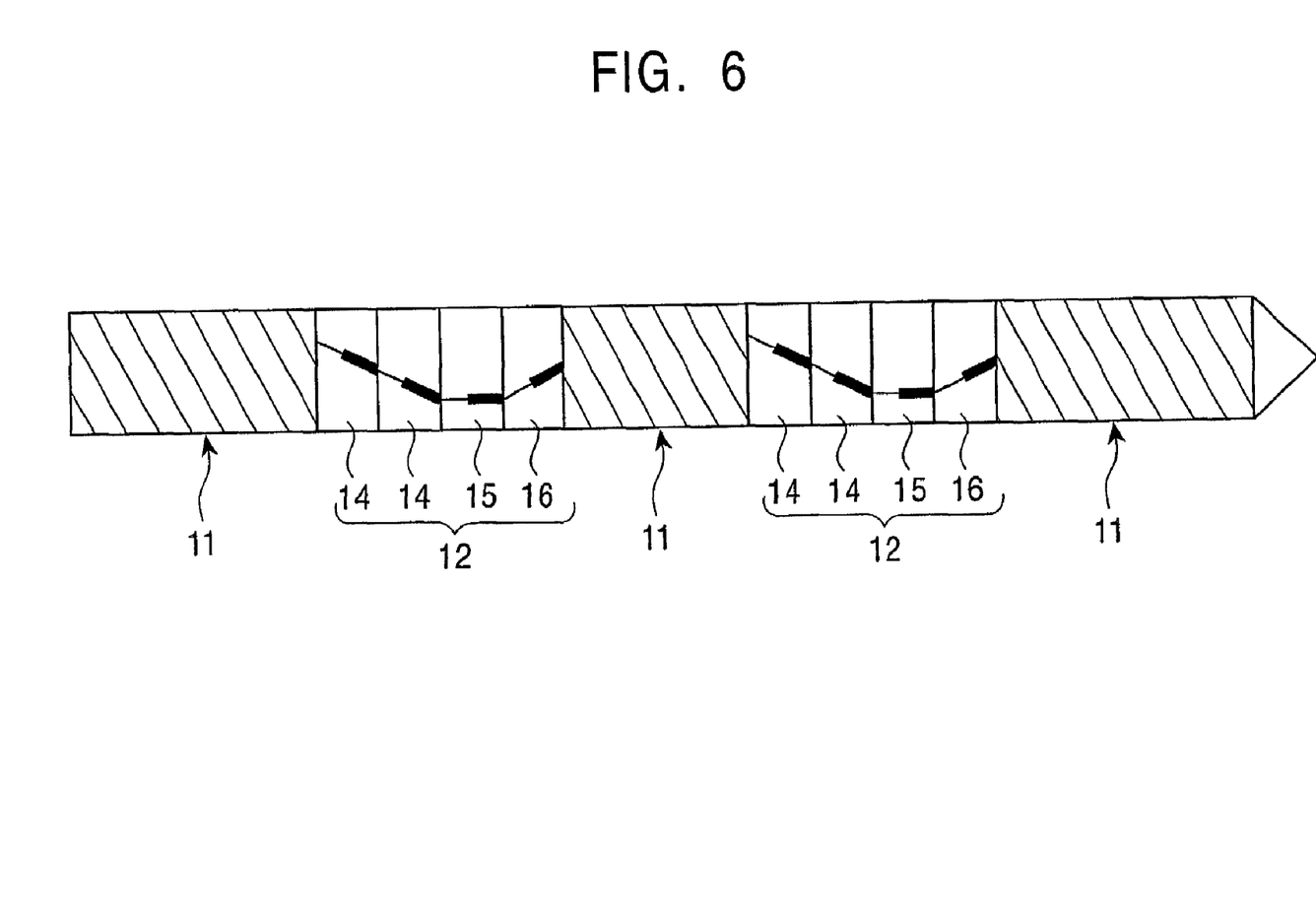
FIG. 6 is an explanatory view showing another combined state of respective segments of the screw set.
Figure 7:
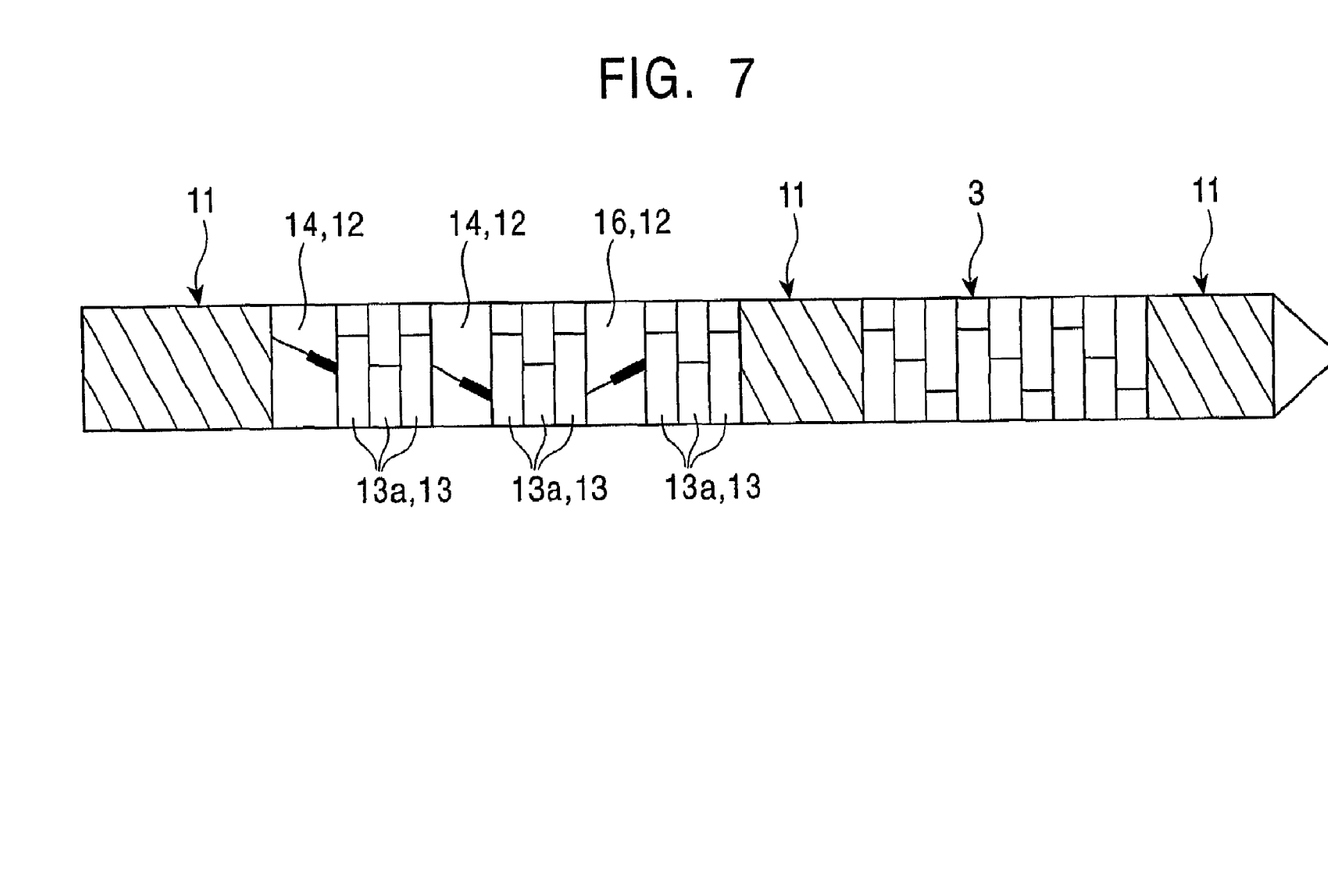
FIG. 7 is an explanatory view showing still another combined state of respective segments of the screw set.

Furthermore, since end surfaces of the kneading rotors 14-16 can be directly connected to each other and to end surfaces of the segment members, the screw set 1 can be constructed of various segments without using any spacers. For example, as shown in FIG. 5, the screw set 1 may be constructed by connecting the rotor segment 12 and the kneading disk segment 13 through the screw segment 11. As another example, as shown in FIG. 6, the screw set 1 may be constructed by arranging the screw segment 11 and the rotor segment 12 alternately. As still another example, as shown in FIG. 7, the screw set 1 may be constructed by forming three rotor segments 12 as the kneading rotors 14, 14 and 16, respectively, and interposing the kneading disk segment 13 between adjacent two of those three rotor segments 12.

Figure 8:
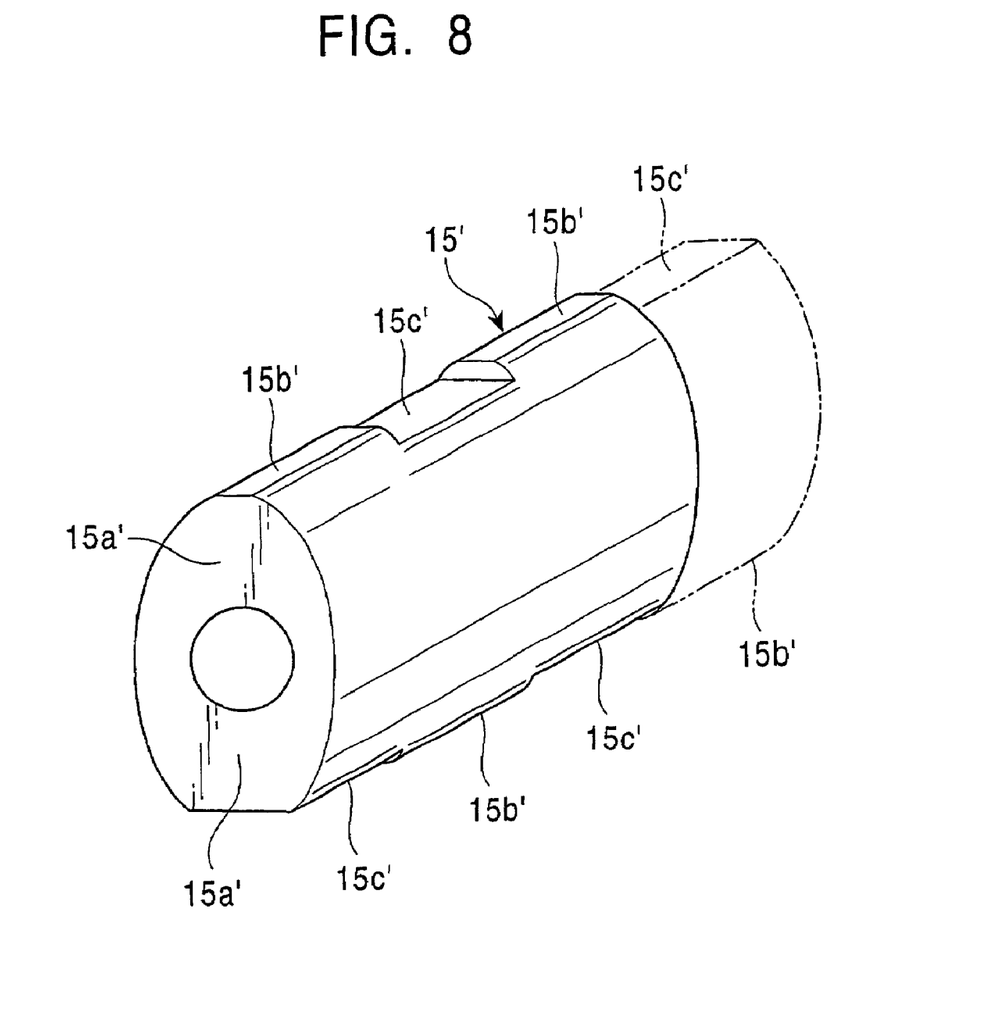
FIG. 8 is a perspective view of one kneading rotor.
Figure 9:
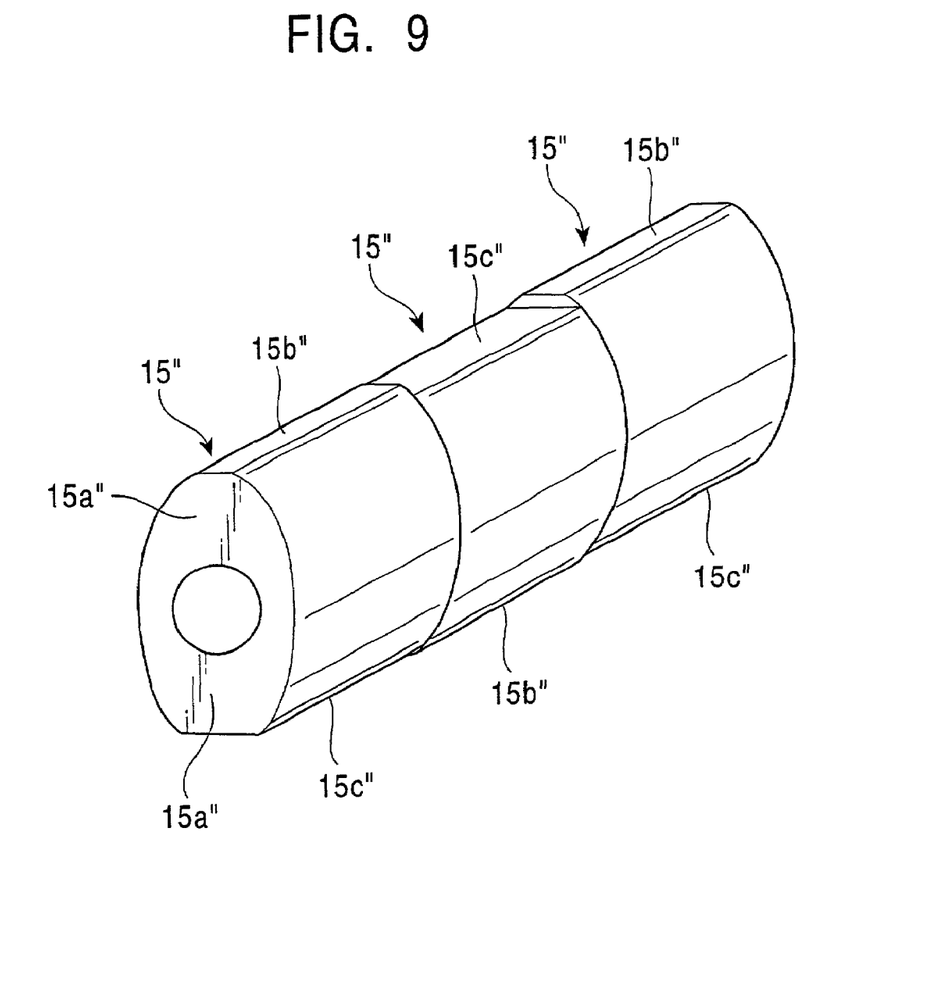
FIG. 9 is a perspective view of another kneading rotor.

Additionally, in the illustrated embodiment, the kneading rotors 14-16 are formed, as seen from FIGS. 3A, 3B and 3C, such that when assembled into the rotor segment 12, the kneading rotors 14-16 each provide a plurality of different tip clearances in the axial direction of the rotor segment 12. The different tip clearances in the axial direction may be provided, as shown in FIG. 8, by employing a single kneading rotor 15, in which a taller tip portion 15*b*, and a lower tip portion 15*c*, are integrally formed to lie in the axial direction. Alternatively, as shown in FIG. 9, the different tip clearances in the axial direction may be provided by combining a plurality of kneading rotor 15", each of which has a taller tip portion 15*b*" or a lower tip portion 15*c*" to extend in the axial direction.

With the above construction, since a plurality of different tip clearances are provided in the axial direction of the rotor segment 12, it is possible to reduce a load partially imposed on the rotor segment 12, and to further promote dispersion and mixing of the target material of kneading.

Moreover, in the illustrated embodiment, the kneading blades 14*a*-16*a* are of three different types as shown in FIGS. 3A, 3B and 3C, i.e., the forward type in which the kneading blade 14*a* is spirally twisted clockwise with respect to the axial direction, the neutral type in which the kneading blade 15*a* is extended parallel to the axial direction, and the backward type in which the kneading blade 16*a* is spirally twisted counterclockwise with respect to the axial direction. The rotor segment 12 is constructed by employing at least one of those three types of kneading rotors. Consequently, a filling state of the kneaded product in the rotor segment 12 can be optionally set by changing a combination of the types of kneading rotors employed, and hence the rotor segment 12 having the mixing and dispersing abilities optimum for properties of the material to be kneaded can be easily realized.

In the illustrated embodiment, as shown in FIG. 1A, the rotor segment 12 is constructed by combining the forward and backward type kneading rotors 14, 16 to be arranged in this order in the flowing direction of the kneaded product. However, the present invention is not limited to such a combination. more specifically, as shown in FIG. 5, the rotor segment 12 may be constructed by combining the three types of kneading rotors 14-16 to be arranged in the order of the forward type, the neutral type, the forward type, the neutral type, and the backward type in the flowing direction of the kneaded product. Alternatively, as shown in FIG. 6, the rotor segment 12 may be constructed by combining the three types of kneading rotors 14-16 to be arranged in the order of the forward type, the forward types the neutral type, and the backward type in the flowing direction of the kneaded product.

Figure 10:
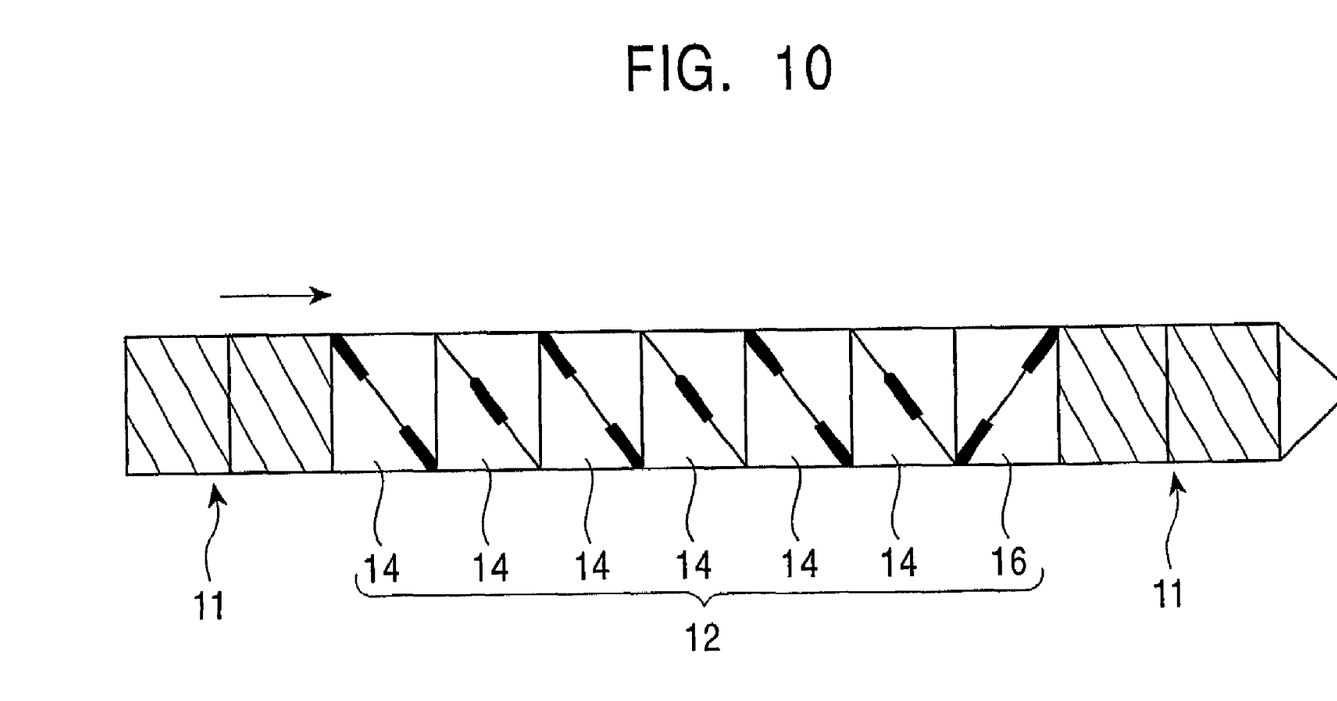
FIG. 10 is an explanatory view showing still another combined state of respective segments of the screw set.

Further, as shown in FIG. 10, the rotor segment 12 may be constructed by a combination including a plurality of the forward type kneading rotors 14 arranged in succession. This combination is suitably used in, particularly, a twins-crew extruder wherein the rotational speed of each screw set 1 is increased to a level not lower than 1000 (rpm). The reason why a kneaded product can be produced by even the rotor segment 12 having such a combination is below. Since the lower tip portion 14*c* provides a greater tip clearance, the amount of the material under kneading which passes through the tip clearance is large, and polymers tend to more easily plasticize and dissolve due to shearing actions imparted to the material under kneading when it passes through the tip clearance. As a result, the material under kneading can be prevented from slipping at the inner wall surface of the barrel 3.

In addition to the combinations of the three types of kneading rotors 14-16, the combination of tip clearances provided by the rotors 14-16 may be also changed. More specifically, the lower tip clearances provided by the taller tip portions 14*b*-16*b* of the rotor segment 12 and the greater tip clearances provided by the lower tip portions 14*c*-16*c* thereof may be set to respective constant values throughout the screw set 1, or may be set to values different for each rotor segment 12. As an alternative, the tip clearances provided by either the taller tip portions 14*b*-16*b* or the lower tip portions 14*c*-16*c* may be set to a constant value throughout the screw set 1, whereas the tip clearances provided by the other tip portions may be set to values different for each rotor segment 12.

In the screw set having the screw diameter of 59 mm as shown in FIG. 1A, for example, the tip clearances provided by the taller tip portions 14*b*-16*b* and the lower tip portions 14*c*-16*c* of the first-stage screw segment 11 may be set respectively to 0.5 mm and 3.0 mm, and the tip clearances provided by the taller tip portions 14*b*-16*b* and the lower tip portions 14*c*-16*c* of the second-stage screw segment 11 may be set respectively to 0.2 mm and 1.0 mm. This setting can improve the effect of dispersing fillers or a polymer gel.

Furthermore, by enlarging the tip clearances provided by the-lower tip portions 14*c*-16*c*, the kneading rotors 14-16 according to the embodiment can be very suitably used in a twin-screw extruder wherein the rotational speed of each screw set 1 is increased to a level not lower than 1000 (rpm).

More specifically, in trying to improve productivity by increasing the rotational speed of each screw set provided with conventional kneading rotors each having a uniform tip clearance in the circumferential direction, it is required to enlarge all the tip clearances in the circumferential direction so that the material under kneading will not be excessively heated. This case therefore gives rise to a drawback that the material under kneading is more likely to adhere to the inner wall surface of the barrel and reside in the barrel for a long time. In contrast, enlarging the tip clearances provided by the lower tip portions 14*c*-16*c* in the kneading rotors 14-16 according to the embodiment provides the following advantages. The greater tip clearances provided by the lower tip portions 14*c*-16*c* function to suppresses heating generated during the kneading process, whereas the taller tip portions 14*b*-16*b* function to scrape off the material under kneading which has adhered to the inner wall surface of the barrel 3. In other words, the heating action by the kneading blades 14*a*-16*a* having the lower tip portions 14*c*-16*c* can be reduced by enlarging the tip clearances provided by the lower tip portions 14*c*-16*c*. As a result, the material under kneading, which has adhered to the inner wall surface of the barrel 3, can be scraped off by the taller tip portions 14*b*-16*b* while suppressing a heating temperature generated in the case of kneading the material by 2-blade type rotors or 3-blade type rotors down to a level generated in the case of employing 1 or 1.5-blade type rotors or 2- or 2.5-blade type rotors, respectively.

Additionally, when the kneading rotors 14-16 having the tip clearances different in the circumferential direction are rotated at a high speed, vibrations are more apt to occur. Looking at the rotor segment 12 as a whole, however, since the tip clearances are changed in both the circumferential direction and the axial direction, vibrations caused by the adjacent tip portions are canceled so that the vibrations will not reach such an excessive level as damaging the rotors.

Obviously, numerous modifications and variations of the present invention are possible in light of the above teachings. It is therefore to be understood that within the scope of the appended claims, the invention may be practiced otherwise than as specifically described herein.

The disclosure of the priority document, Application No. 2000-17982, filed in Japan on Jan. 25, 2000, is incorporated by reference herein in its entirety.

The invention claimed is:

1. A twin-screw extruder for mixing and dispersing a material to be kneaded into a kneaded product having a desired state of kneading and extruding the product from a tip end thereof, said extruder comprising:
   a barrel having two intercommunicating chambers and an extrusion opening at a tip end thereof; and
   a screw set mounted in each of said chambers so as to not completely mesh with one another, each of said screw sets comprising:
   a rotor segment comprising at least one kneading rotor, said kneading rotor having a plurality of kneading blades which provide a plurality of tip clearances different from each other at least in the circumferential direction, said kneading rotor having a constant sectional shape in the axial direction, as viewed in a section transverse to the axial direction, except for crest portions of said kneading blades; and
   a screw segment comprising at least one screw blade, said screw segment, except for crest portions of the screw blades thereof, having the same sectional shape as said at least one rotor segment comprising at least one kneading rotor, as viewed in a section transverse to the axial direction, except for the crest portions of said kneading blades.

2. The screw set in a twin-screw extruder according to claim 1, wherein said rotor segment provides a plurality of tip clearances different from each other in the axial direction of said rotor segment.

3. The screw set in a twin-screw extruder according to claim 1, wherein said same sectional shape is symmetric.

4. The screw set in a twin-screw extruder according to claim 1, wherein said screw sets rotate in the same direction.

* * * * *